United States Patent
Rimai et al.

(10) Patent No.: US 11,181,167 B2
(45) Date of Patent: Nov. 23, 2021

(54) TUNED MASS-SPRING DAMPER

(71) Applicant: Bridgestone Americas Tire Operations, LLC, Nashville, TN (US)

(72) Inventors: Benjamin E. Rimai, Copley, OH (US); Mohammad M. Motamedi, Copley, OH (US); Yousof Azizi, Barberton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 117 days.

(21) Appl. No.: 16/607,199

(22) PCT Filed: Apr. 17, 2018

(86) PCT No.: PCT/US2018/027862
§ 371 (c)(1),
(2) Date: Oct. 22, 2019

(87) PCT Pub. No.: WO2018/200249
PCT Pub. Date: Nov. 1, 2018

(65) Prior Publication Data
US 2020/0386293 A1 Dec. 10, 2020

Related U.S. Application Data

(60) Provisional application No. 62/489,116, filed on Apr. 24, 2017.

(51) Int. Cl.
*F16F 15/14* (2006.01)
*B60B 15/28* (2006.01)

(52) U.S. Cl.
CPC .......... *F16F 15/1442* (2013.01); *B60B 15/28* (2013.01); *B60B 2900/131* (2013.01); *F16C 2326/02* (2013.01); *F16D 2300/22* (2013.01)

(58) Field of Classification Search
CPC ..... F16F 15/137; F16F 15/1442; B60B 15/28; B60B 2380/80; B60B 2900/131;
(Continued)

(56) References Cited

U.S. PATENT DOCUMENTS 3,653,469 A * 4/1972 Landeborg ............ F16D 65/807
188/58
4,405,032 A * 9/1983 Welschof ............ B60B 27/0005
180/259
(Continued)

FOREIGN PATENT DOCUMENTS

DE 102010052919 A1 * 5/2012 ............. B60B 21/12
DE 112004002352 B4 * 12/2017 ............. F16D 3/227
(Continued)

OTHER PUBLICATIONS

International Search Report, dated Jul. 25, 2018, for International Patent Application No. PCT/US2018/027862, filed on Apr. 17, 2018.
(Continued)

*Primary Examiner* — Adam D Rogers
(74) *Attorney, Agent, or Firm* — Shaun J. Fox; Thomas Y. Kendrick

(57) ABSTRACT

A wheel/hub assembly includes an axle shaft, a wheel, and a hub supporting the wheel on the axle shaft. The wheel/hub assembly has a target resonant frequency of vibration. A tuned mass-spring damper is vibrationally coupled to the wheel/hub assembly, and has a counteracting resonant frequency of vibration that is predetermined with reference to the target resonant frequency of vibration.

15 Claims, 6 Drawing Sheets

(58) Field of Classification Search
CPC ........ F16C 3/02; F16C 2326/02; F16C 33/04; F16C 33/08; F16D 65/0006; F16D 65/0012; F16D 65/0018; F16D 2300/22
See application file for complete search history.

(56) References Cited

U.S. PATENT DOCUMENTS

| | | | | |
|---|---|---|---|---|
| 5,188,194 | A * | 2/1993 | Gasch | .................... B60K 17/24 |
| | | | | 180/248 |
| 9,592,847 | B2 * | 3/2017 | Hansen | .................... F16D 3/76 |
| 9,914,500 | B2 * | 3/2018 | Gerencser | ............ B62K 15/006 |
| 2006/0021542 | A1 | 2/2006 | Bieker et al. | |
| 2007/0087848 | A1 * | 4/2007 | Larsen | .................... B60K 17/22 |
| | | | | 464/180 |
| 2009/0197690 | A1 * | 8/2009 | Lyscio | ..................... F16F 7/04 |
| | | | | 464/180 |
| 2011/0070957 | A1 | 3/2011 | Ball et al. | |
| 2012/0067481 | A1 | 3/2012 | Cron | |
| 2014/0171208 | A1 | 6/2014 | Altan et al. | |
| 2017/0144483 | A1 * | 5/2017 | Shigeoka | .............. F16C 19/527 |
| 2019/0375251 | A1 * | 12/2019 | Azizi | .................... B60C 19/002 |
| 2020/0232536 | A1 * | 7/2020 | Orioku | .................. F16F 15/126 |

FOREIGN PATENT DOCUMENTS

| | | | | |
|---|---|---|---|---|
| EP | 3018382 A1 | 5/2016 | | |
| JP | S54148969 A | 11/1979 | | |
| JP | 2006256531 A | * | 9/2006 | ........... B60C 19/002 |
| JP | 2006256531 A | | 9/2006 | |

OTHER PUBLICATIONS

Extended European Search Report dated Mar. 4, 2021 in related European Patent Application No. EP 18791179.7.

* cited by examiner

TUNED MASS-SPRING DAMPER

TECHNICAL FIELD

This technology relates to the suppression of noise, vibration, and harshness (NVH) in a vehicle.

BACKGROUND

Vibrations generated when a tire rolls on a surface can cause undesirable NVH issues including wheel hop, vehicle vibrations, and noise. Typically, dampers in vehicle suspensions or viscoelastic damping in the tire itself can reduce the amplitude of these NVH issues. However, as tires are designed for ever-lower rolling resistance targets, the mass and damping of the tires are reduced which, in turn, reduces their ability to damp vibrations. If a vehicle has low suspension damping and/or low tire damping, NVH issues can be exacerbated.

SUMMARY

In one embodiment, a tuned-mass-spring damper (TMSD) is provided, the TMSD mounted to the wheel itself or the hub or the axle shaft of a vehicle, approximately concentric with the wheel. This TMSD may absorb vibrational energy from the wheel/hub assembly such that the vibrational energy transmitted to the vehicle itself is tuned and reduced. However, unlike a tire with high damping, this invention may not contribute significantly to rolling resistance. Additionally, unlike a vehicle with high suspension damping, this invention may not cause vibrations to be transmitted to the vehicle itself. In other words, this invention may reduce vibrations without increasing rolling resistance.

The TMSD may be connected to the wheel or hub or axle by means of a bearing such that the TMSD can rotate independently from the wheel. This arrangement may permit the TMSD to remain rotationally fixed (i.e. not rotating) even if the wheel itself is rotating. In one embodiment, the primary advantage of the arrangement comes from the fact that the TMSD would not need to rotate with the wheel. Because the TMSD does not need to rotate with the wheel, it may eliminate two potentially detrimental effects on vehicle performance that could be caused if the TMSD was forced to rotate with the wheel:

1. Reduced acceleration and braking performance due to the added rotational inertia of rotating TMSD; and
2. Reduced steering performance due to the gyroscopic procession of a rotating TMSD.

In one embodiment, a wheel/hub assembly includes an axle shaft, a wheel, and a hub supporting the wheel on the axle shaft. The wheel-hub assembly may have a target resonant frequency of vibration. A TMSD may be vibrationally coupled to the wheel/hub assembly. The TMSD may have a counteracting resonant frequency of vibration that is predetermined with reference to the target resonant frequency of vibration.

The TMSD may be configured in distinct portions of elastic material that establish the counteracting resonant frequency of vibration. These may include a spring portion overlying a part of the wheel/hub assembly, and a mass portion overlying the spring portion. An embodiment of the TMSD may thus include distinct portions of rubber or other elastic material configured as layers of an elastic structure mounted on the wheel/hub assembly.

The distinct portions of the elastic structure may have properties of density and stiffness that are predetermined with reference to the counteracting resonant frequency. The portions of elastic material may thus include a first portion having stiffness that is predetermined with reference to the counteracting resonant frequency, and a second portion having density that is predetermined with reference to the counteracting resonant frequency.

DETAILED DESCRIPTION

Figure 1:
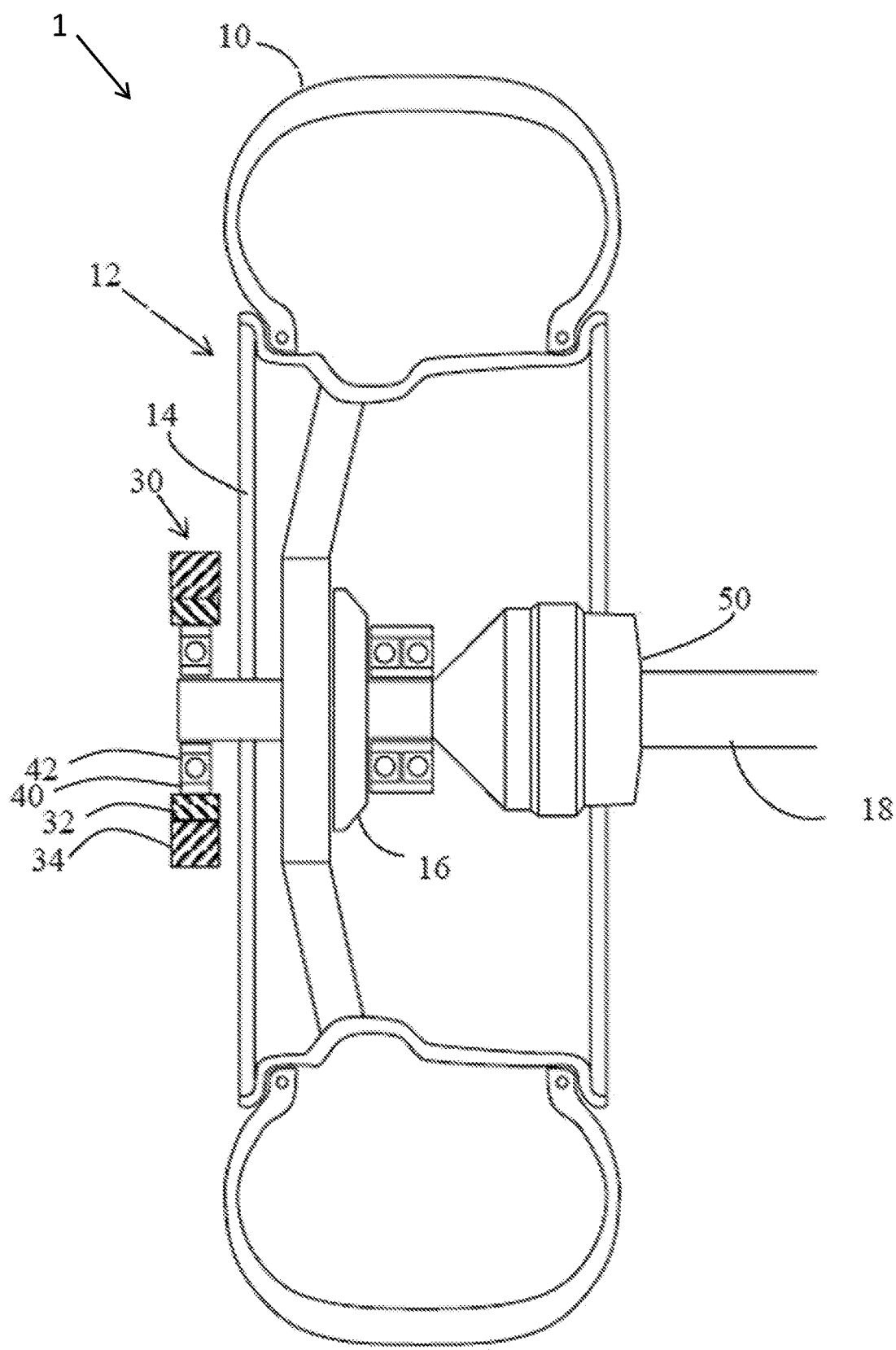
FIG. 1 is a schematic cross-sectional view showing a first embodiment of a tire and wheel/hub assembly equipped with a TMSD for suppressing NVH.

The structures illustrated in the drawings include examples of the elements recited in the claims. The illustrated structures thus include examples of how a person of ordinary skill in the art can make and use the claimed invention. These examples are described to meet the enablement requirements of the patent statute without imposing limitations that are not recited in the claims. One or more of the elements of one embodiment may be used in combination with, or as a substitute for, one or more elements another as needed for any particular implementation of the invention.

As shown schematically in FIG. 1, an apparatus 1 includes a tire 10, which may be mounted on a vehicle wheel/hub assembly 12. The wheel/hub assembly 12 may include at least two of a wheel 14, a hub 16 and an axle shaft 18. In use, the tire 10 and the wheel/hub assembly 12 may be subjected to dynamic forces from the road surface. Such forces can induce NVH. The applied dynamic forces may vary throughout a band of frequencies. The tire 10 and the wheel/hub assembly 12 may then experience a corresponding range of vibrational modes induced by the applied dynamic forces. A narrow band of frequencies may include frequencies at which the wheel/hub assembly 12 has a resonant vibratory response. The wheel/hub assembly 12 may then experience a corresponding resonant mode of vibration. Such a resonant mode of vibration may generate excessive NVH.

Figure 2:
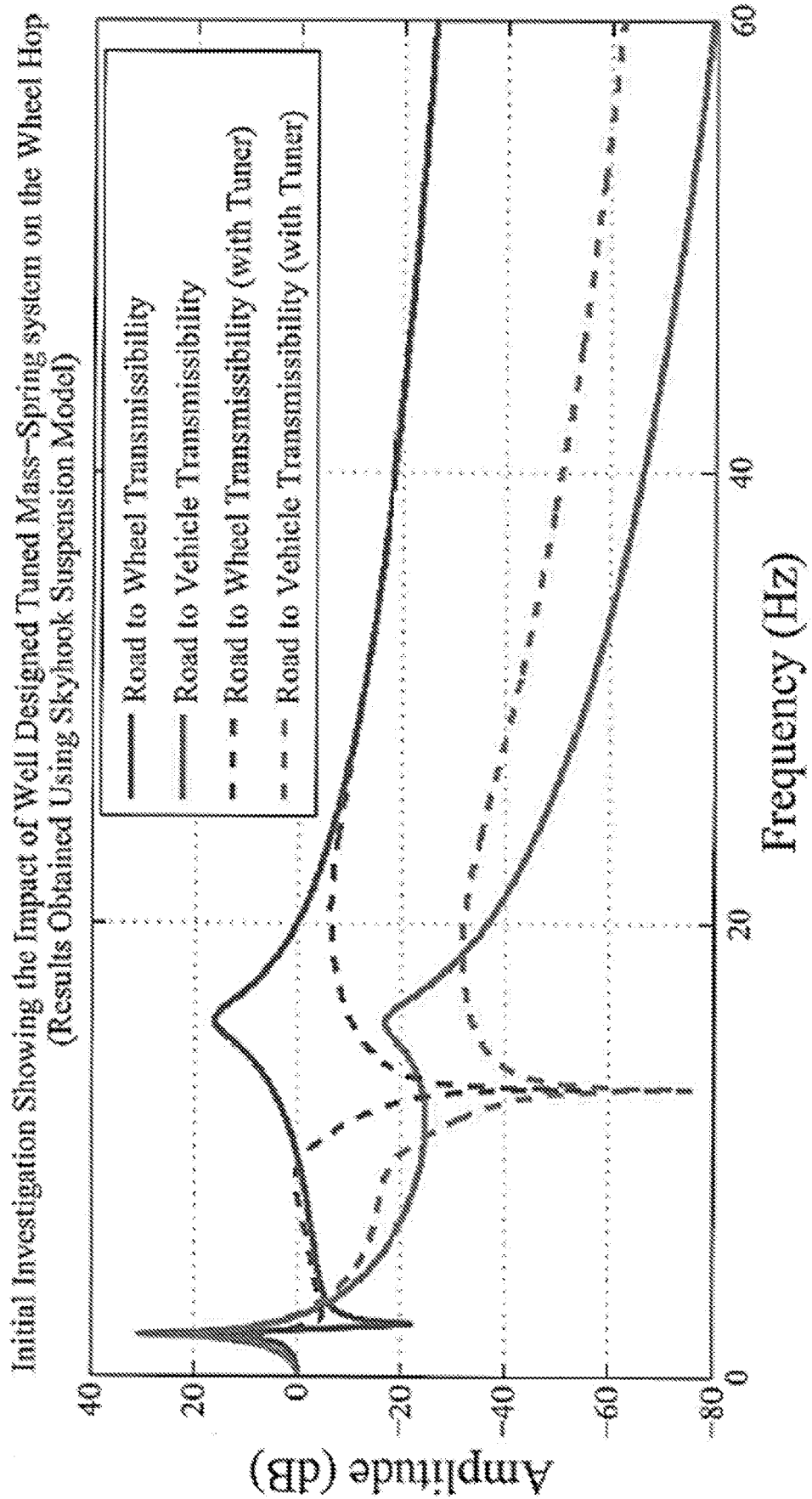
FIG. 2 is a graph showing NVH performance characteristics of a wheel/hub assembly.

For example, the solid curves in FIG. 2 indicates levels of NVH generated by a wheel/hub assembly across a range of force input frequencies. The peaks in the solid line curves indicate NVH levels generated by resonant vibratory responses in the wheel/hub assembly. The peaks in the solid line curves thus occur at resonant frequencies of vibration in the wheel/hub assembly. Accordingly, a wheel/hub assembly as represented here will vibrate in a resonant mode at each force input frequency corresponding to a peak in a solid line curve.

Referring again to FIG. 1, a resonant frequency of NVH in the wheel/hub assembly 12 may be determined in a known manner. The determined resonant frequency may be selected as a target resonant frequency for which the resulting NVH is sought to be attenuated. One or more TMSDs 30 may then be tuned to have a resonant frequency of vibration equal or substantially equal to the target frequency. When a TMSD 30 is operatively coupled to the wheel/hub assembly 12, as shown for example in FIG. 1, it can be oriented to vibrate at the target frequency in a resonant mode that acts oppositely to the resonant mode of vibration in the wheel/hub assembly 12. The counteracting vibrational force inputs from the TMSD 30 can suppress vibrational displacement that might otherwise occur. This can attenuate the NVH generated by vibration at the target frequency, as indicated by the dashed line curves shown in FIG. 2.

The wheel/hub assembly 12 of FIG. 1 may be equipped with a TMSD 30 for suppressing vibration as described above. In this embodiment, the TMSD 30 is configured as a circumferentially continuous ring centered coaxially over the axle shaft 18. The TMSD 30 has distinct portions of elastic material with properties of density and stiffness that are predetermined with reference to the counteracting resonant frequency. The portions of elastic material may include a first portion in which the stiffness is predetermined with reference to the counteracting resonant frequency, and a second portion in which the density is predetermined with reference to the counteracting resonant frequency.

More specifically, the distinct portions of elastic material in the illustrated TMSD 30 include an inner layer 32 of rubber, and an outer layer 34 of rubber that overlies and is bonded to the inner layer 32. The inner layer 32 may be mounted on the outer race 40 of a bearing 42 on the axle shaft 18. The bearing 42 may couple the TMSD 30 vibrationally with the wheel/hub assembly 12 at the axle shaft 18, but may permit the TMSD 30 to float rotationally relative to the axle shaft 18.

The inner and outer layers 32 and 34 of the TMSD 30 may have the same stiffness or differing stiffness, but in either case the stiffness of the inner layer 32 may be predetermined with reference to the counteracting resonant frequency. The inner and outer layers 32 and 34 may also have the same density or differing density, but in either case the density of the outer layer 34 may be predetermined with reference to the counteracting resonant frequency. This enables the inner layer 32 to serve as a spring portion of the TMSD 30, with the outer layer 34 serving as a mass portion coupled to the spring portion. When the wheel/hub assembly 12 vibrates, the TMSD 30 may act as a spring/mass system to counteract the vibration. The counteracting spring/mass actions of the TMSD 30 are optimal at the resonant frequency of vibration to which the TMSD 30 is tuned. Since the TMSD 30 is tuned to the target resonant frequency of the wheel/hub assembly 12, it applies optimal resistance to vibration of the wheel/hub assembly 12 in the corresponding resonant mode.

Figure 3:
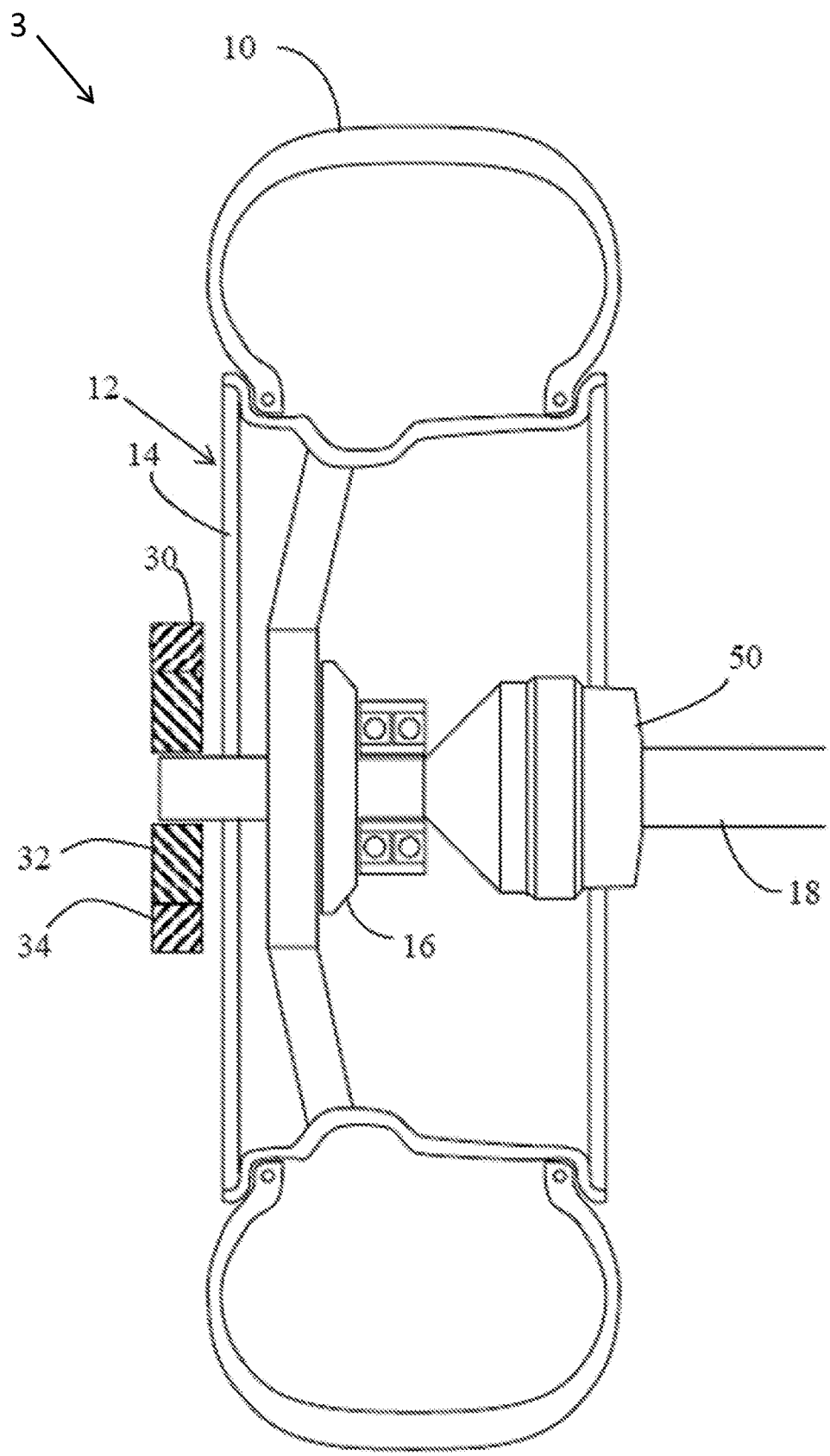
FIG. 3 is a schematic cross-sectional view showing a second embodiment of a tire and wheel/hub assembly equipped with a TMSD for suppressing NVH.
Figure 4:
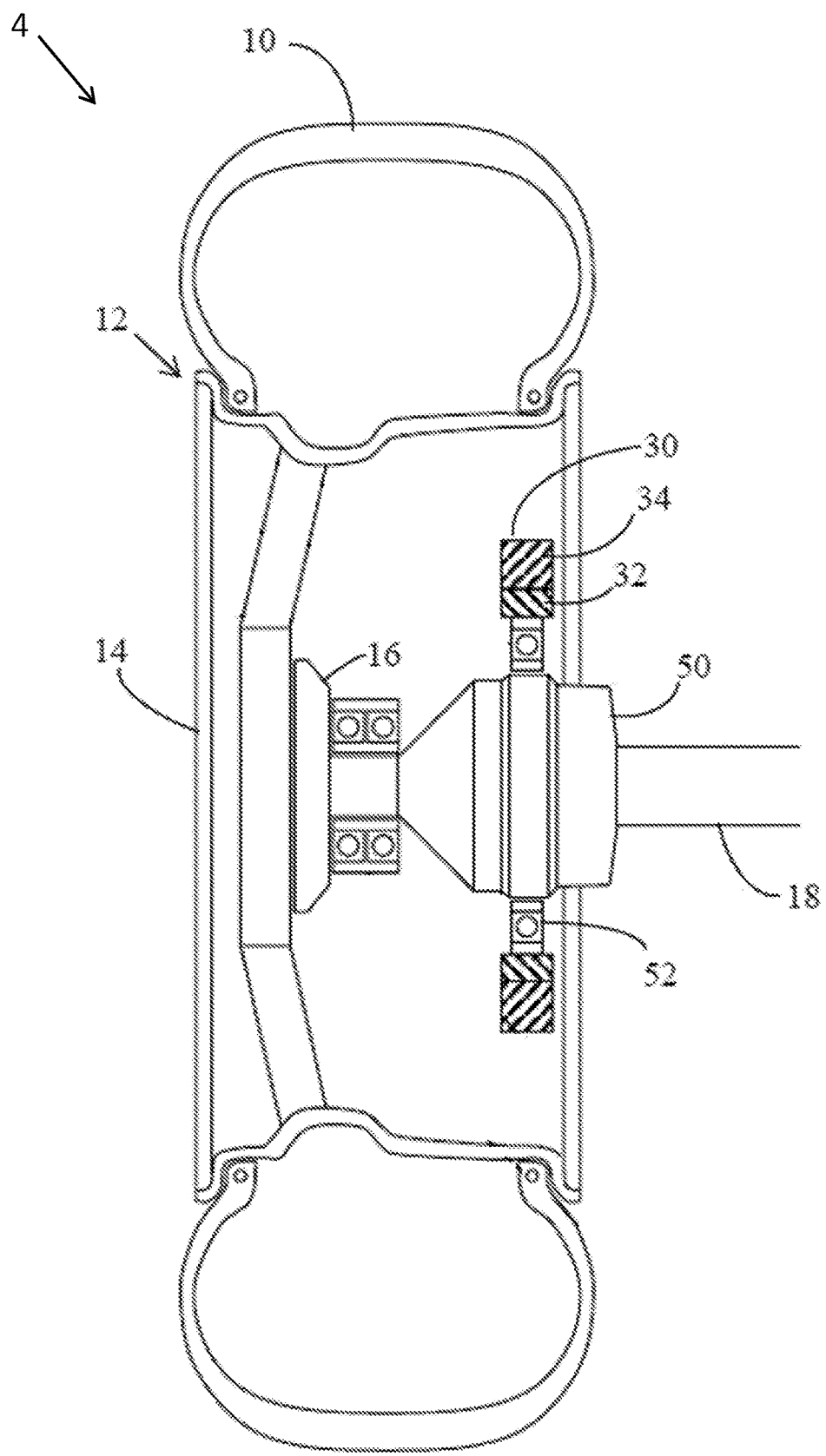
FIG. 4 is a schematic cross-sectional view showing a third embodiment of a tire and wheel/hub assembly equipped with a TMSD for suppressing NVH.
Figure 5:
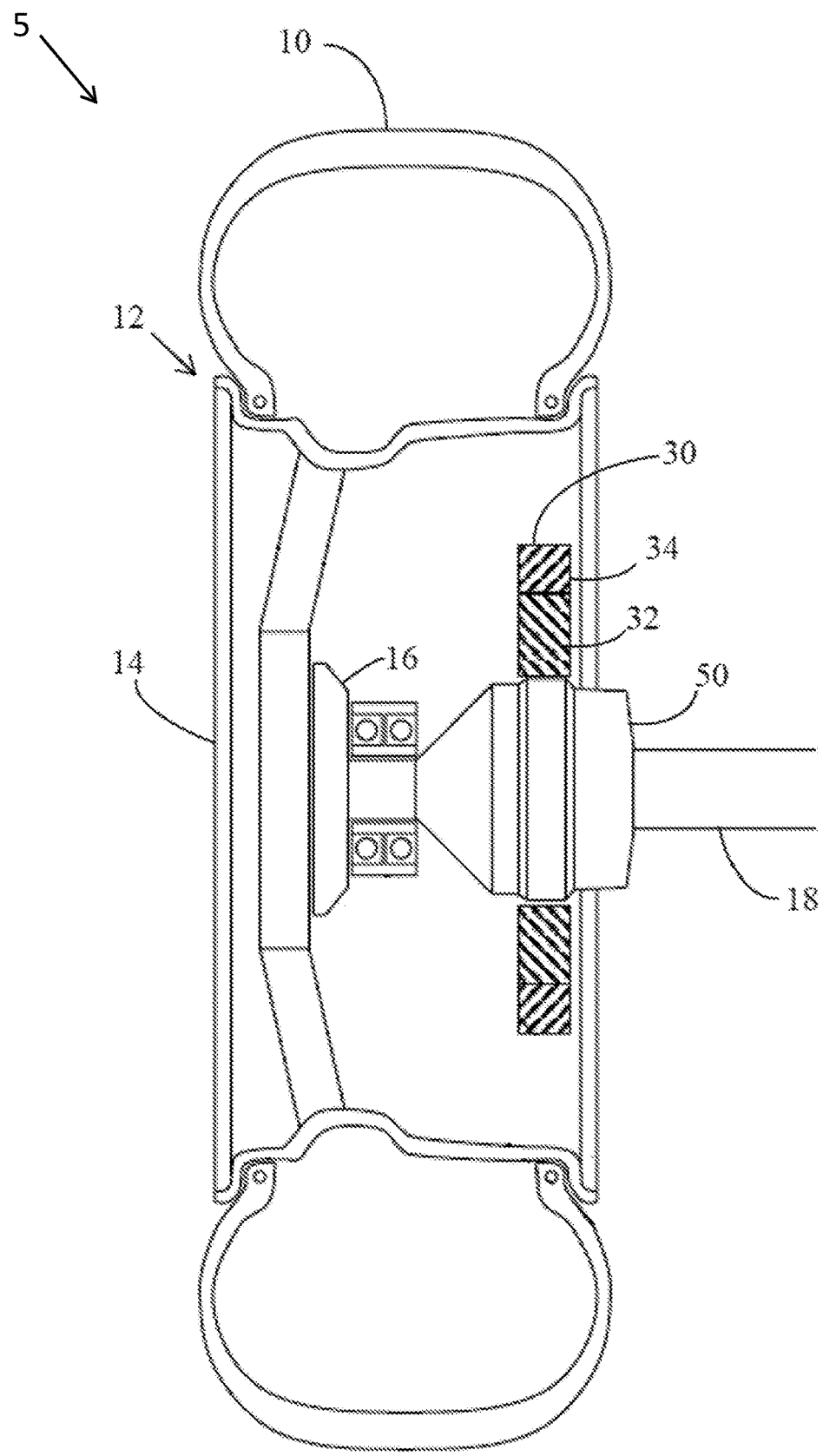
FIG. 5 is a schematic cross-sectional view showing a fourth embodiment of a tire and wheel/hub assembly equipped with a TMSD for suppressing NVH.
Figure 6:
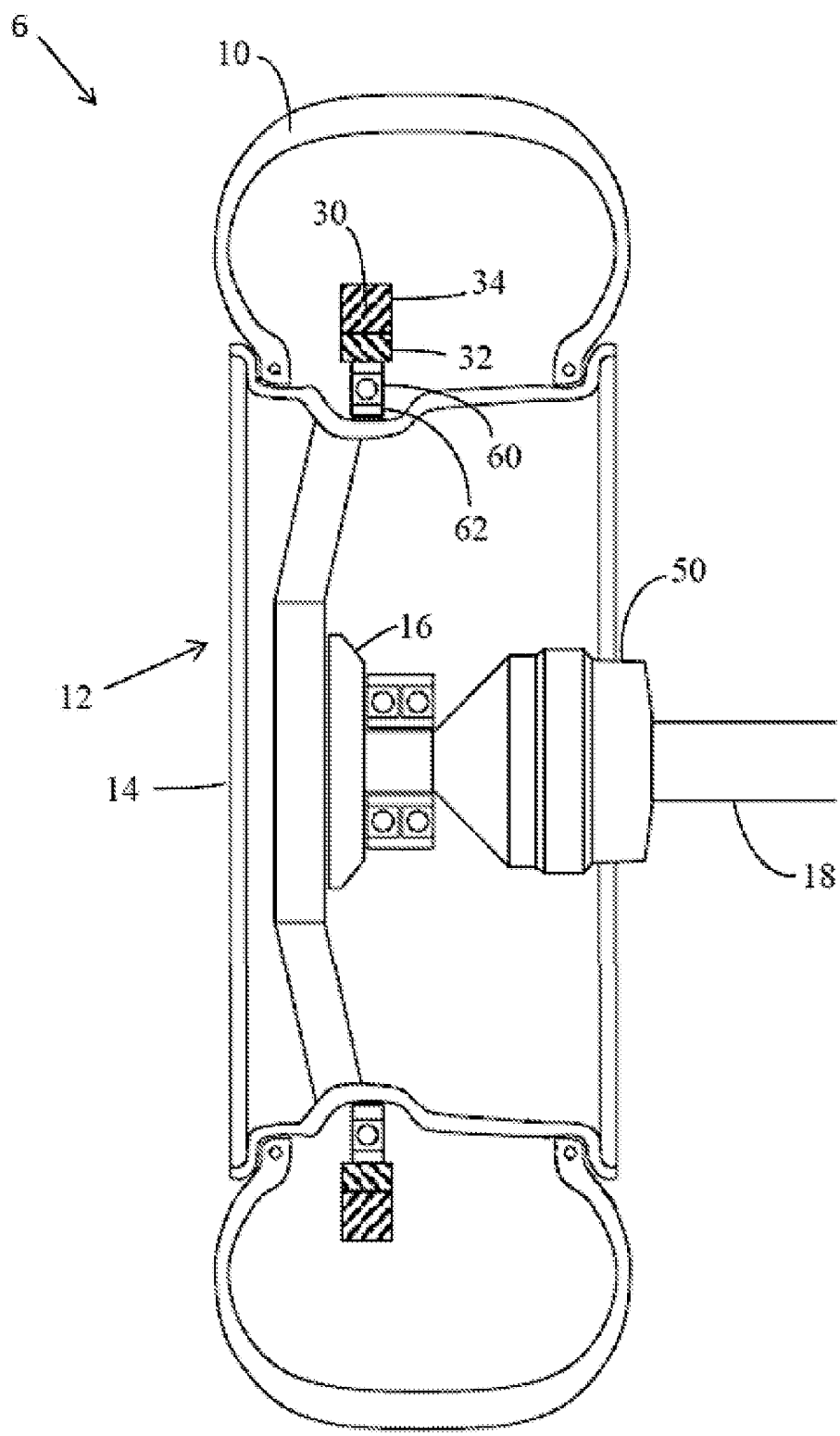
FIG. 6 is a schematic cross-sectional view showing a fifth embodiment of a tire and wheel/hub assembly equipped with a TMSD for suppressing NVH.

The TMSD 30 can be coupled, and/or vibrationally coupled, with the wheel/hub assembly 12 in other arrangements. For example, in the embodiment of FIG. 3, an apparatus 3 is illustrated in which the TMSD 30 may be mounted directly on the axle shaft 18. In the embodiment of FIG. 4, an apparatus 4 is illustrated in which the TMSD 30 may be coupled to a constant velocity (CV) joint 50 through a bearing 52 similar to the bearing 42 of FIG. 1. As shown in FIG. 5, an apparatus 5 is illustrated in which the TMSD 30 can be mounted directly on the CV joint 50, without the use of a bearing. In the embodiment of FIG. 6, an apparatus 6 is illustrated in which the TMSD 30 may be located within the tire 10, and may be coupled to the wheel/hub assembly 12 through a bearing 60 having an inner race 62 fixed to the wheel 14 to rotate with the wheel 14. Other arrangements could include, for example, mounting the TMSD 30 on the wheel 14 without a bearing, on the hub 16 either with or without a bearing, at another location on the axle shaft 18, or at any other suitable location on the wheel/hub assembly 12.

In one embodiment, an apparatus is provided, the apparatus comprising: a wheel/hub assembly including an axle shaft, a wheel, and a hub supporting the wheel on the axle shaft, the wheel/hub assembly having a target resonant frequency of vibration; and a tuned mass-spring damper vibrationally coupled to the wheel/hub assembly and having a counteracting resonant frequency of vibration that is predetermined with reference to the target resonant frequency of vibration. In one embodiment, the damper is configured as a circumferentially continuous ring and is mounted concentrically on the wheel/hub assembly. In one embodiment, the counteracting resonant frequency is equal or substantially equal to the target resonant frequency. In one embodiment, the damper is configured in distinct portions of elastic material having properties of density and stiffness that are predetermined with reference to the counteracting resonant frequency. In one embodiment, the distinct portions of elastic material include a first portion having stiffness predetermined with reference to the counteracting resonant frequency, and a second portion having density predetermined with reference to the counteracting resonant frequency. In one embodiment, the distinct portions of elastic material have the same stiffness. In one embodiment, the distinct portions of elastic material have differing stiffness. In one embodiment, the distinct portions of elastic material have the same density. In one embodiment, the distinct portions of elastic material have differing density. In one embodiment, the distinct portions of elastic material include a spring portion overlying a part of the wheel/hub assembly and having stiffness predetermined with reference to the counteracting resonant frequency, and further include a mass portion overlying the spring portion and having density predetermined with reference to the counteracting resonant frequency. In one embodiment, the distinct portions of elastic material are configured as layers of a circumferentially continuous ring. In one embodiment, the damper is coupled to the wheel/hub assembly through a bearing on the axle shaft. In one embodiment, the damper is mounted directly on the axle shaft. In one embodiment, the wheel/hub assembly includes a CV joint, and the damper is coupled to the wheel/hub assembly through a bearing on the CV joint. In one embodiment, the wheel/hub assembly includes a CV joint, and the damper is mounted directly on the CV joint. In one embodiment, the damper is coupled to the wheel/hub assembly through a bearing mounted on the wheel at a location within the tire.

In another embodiment, an apparatus for use with a wheel/hub assembly including an axle shaft, a wheel, and a hub supporting the wheel on the axle shaft, the wheel/hub assembly having a target resonant frequency of vibration, is provided, the apparatus comprising: a tuned mass-spring damper configured for vibrational coupling to the wheel/hub assembly and having a predetermined resonant frequency of vibration. In one embodiment, the wheel/hub assembly has a resonant frequency of vibration, and the resonant frequency of vibration of the damper is predetermined with reference to the resonant frequency of vibration of the wheel/hub assembly. In one embodiment, the resonant frequency of vibration of the damper is equal or substantially equal to the resonant frequency of vibration of the wheel/hub assembly. In one embodiment, the damper is configured in distinct portions of elastic material having properties of density and stiffness that are predetermined with reference to the resonant frequency of vibration. In one embodiment, the portions of elastic material include a first portion having stiffness predetermined with reference to the resonant frequency of vibration, and a second portion having density predetermined with reference to the resonant frequency of vibration. In one embodiment, the distinct portions of elastic material have the same stiffness. In one embodiment, the distinct portions of elastic material have differing stiffness. In one embodiment, the distinct portions of elastic material have the same density. In one embodiment, the distinct portions of elastic material have differing density. In one embodiment, the distinct portions of elastic material are configured as layers of a circumferentially continuous ring.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in tire manufacturing, which in one embodiment is ±6.35 millimeters (±0.25 inches). To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. An apparatus comprising:
   a wheel/hub assembly including an axle shaft, a wheel, and a hub supporting the wheel on the axle shaft, the wheel/hub assembly having a target resonant frequency of vibration; and
   a tuned mass-spring damper vibrationally coupled to the wheel/hub assembly and having a counteracting resonant frequency of vibration that is predetermined with reference to the target resonant frequency of vibrations;
   wherein the damper is coupled to the wheel/hub assembly through a bearing on the axle shaft.

2. An apparatus as defined in claim 1, wherein the damper is configured as a circumferentially continuous ring and is mounted concentrically on the wheel/hub assembly.

3. An apparatus as defined in claim 1, wherein the counteracting resonant frequency is equal to the target resonant frequency.

4. An apparatus as defined in claim 1, wherein the damper is configured in distinct portions of elastic material having properties of density and stiffness that are predetermined with reference to the counteracting resonant frequency.

5. An apparatus as defined in claim 4, wherein the distinct portions of elastic material include a first portion having stiffness predetermined with reference to the counteracting resonant frequency, and a second portion having density predetermined with reference to the counteracting resonant frequency.

6. An apparatus for use with a wheel/hub assembly including an axle shaft, a wheel, and a hub supporting the wheel on the axle shaft, the wheel/hub assembly having a target resonant frequency of vibration, the apparatus comprising:
   a tuned mass-spring damper comprising:
      an inner layer of rubber; and
      an outer layer of rubber that overlies and is bonded to the inner layer;
      wherein the inner layer is mounted on an outer race of a bearing on the axle shaft.

7. An apparatus as defined in claim 6, wherein the bearing couples the tuned mass-spring damper vibrationally with the wheel/hub assembly at the axle shaft.

8. An apparatus as defined in claim 7, wherein the bearing permits the tuned mass-spring damper to float rotationally relative to the axle shaft.

9. An apparatus as defined in claim 6, wherein the inner layer serves as a spring portion of the tuned mass-spring damper.

10. An apparatus as defined in claim 9, wherein the outer layer serves as a mass portion coupled to the spring portion.

11. An apparatus comprising:
    a wheel/hub assembly including an axle shaft, a wheel, and a hub supporting the wheel on the axle shaft, the wheel/hub assembly having a target resonant frequency of vibration; and
    a tuned mass-spring damper vibrationally coupled to the wheel/hub assembly and having a counteracting resonant frequency of vibration that is predetermined with reference to the target resonant frequency of vibration;
    wherein the damper is coupled to the wheel/hub assembly through a bearing mounted on the wheel at a location within a tire.

12. An apparatus as defined in claim 11, wherein the damper is configured as a circumferentially continuous ring and is mounted concentrically on the wheel/hub assembly.

13. An apparatus as defined in claim 11, wherein the counteracting resonant frequency is equal to the target resonant frequency.

14. An apparatus as defined in claim 11, wherein the damper is configured in distinct portions of elastic material having properties of density and stiffness that are predetermined with reference to the counteracting resonant frequency.

15. An apparatus as defined in claim 14, wherein the distinct portions of elastic material include a first portion having stiffness predetermined with reference to the counteracting resonant frequency, and a second portion having density predetermined with reference to the counteracting resonant frequency.

\* \* \* \* \*